(12) United States Patent
Yamasaki et al.

(10) Patent No.: US 11,446,906 B2
(45) Date of Patent: Sep. 20, 2022

(54) DECORATIVE SHEETS

(71) Applicant: TOPPAN PRINTING CO.,LTD., Tokyo (JP)

(72) Inventors: Yoshimi Yamasaki, Tokyo (JP); Mami Nagashima, Tokyo (JP); Masamitsu Nagahama, Tokyo (JP); Masatoshi Takahashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/351,116

(22) Filed: Jun. 17, 2021

(65) Prior Publication Data

US 2021/0316540 A1   Oct. 14, 2021

Related U.S. Application Data

(63) Continuation of application No. PCT/JP2019/049431, filed on Dec. 17, 2019.

(30) Foreign Application Priority Data

| Dec. 19, 2018 | (JP) | JP2018-237475 |
| Dec. 25, 2018 | (JP) | JP2018-241487 |
| Jun. 12, 2019 | (JP) | JP2019-109383 |

(51) Int. Cl.
*B32B 27/08* (2006.01)
*B32B 27/20* (2006.01)
(Continued)

(52) U.S. Cl.
CPC .............. *B32B 27/08* (2013.01); *B32B 7/12* (2013.01); *B32B 27/16* (2013.01); *B32B 27/20* (2013.01);
(Continued)

(58) Field of Classification Search
CPC .......... B32B 27/08; B32B 7/12; B32B 27/32; B32B 27/16; B32B 27/20;
(Continued)

(56) References Cited

U.S. PATENT DOCUMENTS

2018/0186132 A1* 7/2018 Ikeda ................ B32B 27/32

FOREIGN PATENT DOCUMENTS

| JP | 3271022 B2 | 4/2002 |
| JP | 3772634 B2 | 5/2006 |

(Continued)

OTHER PUBLICATIONS

Machine translation of JP 2017-024361. (Year: 2017).*

(Continued)

*Primary Examiner* — John D Freeman
(74) *Attorney, Agent, or Firm* — Foley & Lardner LLP

(57) ABSTRACT

A decorative sheet includes a primary film layer; a transparent resin layer; and a surface protective layer, in this order; the surface protective layer is formed of a plurality of layers with a layer located on an outermost surface is a surface protective layer, and a layer underlying the surface protective layer is a second surface protective layer and includes one or more ionizing radiation-curable resins having an erosion rate E in a range of 0.10 μm/g or more and 0.45 μm/g or less, and one or more thermosetting resins having an erosion rate E in a range of 0.30 μm/g or more and 0.6 μm/g or less, the erosion rate E being measured by using polygonal alumina powder having an average particle size (D50) of 1.2 μm, and a mass ratio between the ionizing radiation-curable resin and the thermosetting resin (ionizing radiation-curable resin/thermosetting resin) is 95/5 to 40/60.

15 Claims, 1 Drawing Sheet

(51) Int. Cl.
*B32B 27/32* (2006.01)
*B32B 7/12* (2006.01)
*B32B 27/16* (2006.01)

(52) U.S. Cl.
CPC .......... *B32B 27/32* (2013.01); *B32B 2250/03* (2013.01); *B32B 2250/24* (2013.01); *B32B 2255/10* (2013.01); *B32B 2255/26* (2013.01); *B32B 2264/1023* (2020.08); *B32B 2307/412* (2013.01); *B32B 2307/584* (2013.01); *B32B 2307/712* (2013.01)

(58) Field of Classification Search
CPC .......... B32B 2307/584; B32B 2255/10; B32B 2307/712; B32B 2255/26; B32B 2307/412; B32B 2264/1023; B32B 2250/03; B32B 2250/24; B32B 3/30; B32B 2255/02; B32B 5/022; B32B 5/18; B32B 15/18; B32B 15/20; B32B 27/065; B32B 27/36; B32B 2250/02; B32B 2255/06; B32B 2255/102; B32B 2255/12; B32B 2255/20; B32B 2255/205; B32B 2260/028; B32B 2266/0242; B32B 2307/4026; B32B 15/085; B32B 25/08; B32B 27/302; B32B 2266/0221; B32B 2266/025; B32B 2266/0264; B32B 2307/70; B32B 15/082; B32B 25/16; B32B 27/10; B32B 27/12; B32B 27/306; B32B 27/308; B32B 27/365; B32B 2266/0228; B32B 25/14; B32B 27/34; B32B 2255/28; B32B 2260/046; B32B 2264/10; B32B 2266/0257; B32B 2307/732; B32B 2451/00; B32B 27/18; B32B 7/022; B32B 27/00; C08J 2300/10; C08J 2300/12; C08J 7/042; C08J 7/043; C08J 7/046; C08J 2300/24; C08K 9/04; C08K 2201/005; C08K 3/013; C08K 9/00; C09D 7/62

See application file for complete search history.

(56) References Cited

FOREIGN PATENT DOCUMENTS

| | | | |
|---|---|---|---|
| JP | 3861472 B2 | 12/2006 | |
| JP | 2013-203060 A | 10/2013 | |
| JP | 2016-093966 A | 5/2016 | |
| JP | 2017-007156 A | 1/2017 | |
| JP | 2017024361 A * | 2/2017 | |
| WO | WO-2016076360 A1 * | 5/2016 | ............... B32B 7/12 |

OTHER PUBLICATIONS

International Searching Authority, "International Search Report," issued in connection with International Patent Application No. PCT/JP2019/049431, dated Feb. 4, 2020.

International Searching Authority, "Written Opinion," issued in connection with International Patent Application No. PCT/JP2019/049431, dated Feb. 4, 2020.

European Extended Search Report, dated Jan. 12, 2022, issued in corresponding European Patent Application No. 19898116.9, (7 pages).

* cited by examiner

DECORATIVE SHEETS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/049431, filed on Dec. 17, 2019, which is based upon and claims the benefit of priority to Japanese Patent Application Nos. 2018-237475, filed on Dec. 19, 2018; 2018-241487, filed on Dec. 25, 2018; and 2019-109383, filed on Jun. 12, 2019, the disclosures of which are incorporated herein by reference in their entireties.

BACKGROUND

Technical Field

The present invention relates to decorative sheets.

Background Art

In recent years, as shown in PTLs 1 to 3, for example, a number of decorative sheets which use olefin-based resin have been proposed as alternative decorative sheets to polyvinyl chloride decorative sheets.

These decorative sheets, which do not use vinyl chloride resin, can reduce the production of toxic gas during incineration. However, for example, general polypropylene sheets or soft polypropylene sheets tend to have a poor surface scratch resistance. Therefore, decorative sheets using olefin-based resin may have poor scratch resistance compared to conventional polyvinyl chloride decorative sheets.

[Citation List] [Patent Literature] PTL 1: JP 3271022 B; PTL 2: JP 3861472 B; PTL 3: JP 3772634 B.

SUMMARY OF THE INVENTION

Technical Problem

There has been a known method for improving the scratch resistance of decorative sheets in which an ionizing radiation-curable resin is applied to a surface protective layer and cured. However, this does not completely prevent the decorative sheets from being damaged. The decorative sheets have a problem that they may be damaged when a scratch resistance test is performed under high load conditions.

Therefore, in order to improve scratch resistance under high load conditions, increasing the hardness and thickness of a surface protective layer has been proposed. However, this causes problems that an excessively hard surface protective layer may be too brittle, leading to poor impact resistance against falling objects and poor weather resistance, and a thick surface protective layer may cause an increase in the cost.

Furthermore, in order to improve scratch resistance under high load conditions, increasing the hardness and thickness of a transparent resin layer underlying the surface protective layer has also been proposed. However, as with case of the surface protective layer, this causes problems that an excessively hard transparent resin layer may be too brittle, leading to poor impact resistance against falling objects and poor weather resistance, and a thick transparent resin layer may cause an increase in the cost.

Furthermore, in order to improve scratch resistance under high load conditions, adding an inorganic filler to a surface protective layer has also been proposed. However, the inorganic filler added to the surface protective layer may cause problems that it may greatly protrude from the surface protective layer or, when it has a gap at the interface with the surface protective layer, the inorganic filler may break in a scratch resistance test or may be detached from the surface protective layer, which causes a change in gloss.

The present invention has been made in view of the above issues, and is directed to provide decorative sheets having improved scratch resistance under high load conditions.

Solution to Problem

As a result of intensive research to achieve the above object, the present inventors have found that the above-mentioned problems can be solved by forming at least one of a surface protective layer and a transparent resin layer having a specific erosion rate on the decorative sheet.

According to an aspect of the present invention, a decorative sheet includes: a primary film; a transparent resin layer; and a surface protective layer, laminated in this order, wherein the surface protective layer is formed of a plurality of layers, a layer of the surface protective layer located on an outermost surface is a first surface protective layer, and a layer underlying the first surface protective layer is a second surface protective layer, the first surface protective layer includes one or more ionizing radiation-curable resins having an erosion rate E in a range of 0.10 µm/g or more and 0.45 µm/g or less, and one or more thermosetting resins having an erosion rate E in a range of 0.30 µm/g or more and 0.6 µm/g or less, the erosion rate E being measured by using polygonal alumina particles having an average particle size (D50) of 1.2 µm, and a mass ratio between the ionizing radiation-curable resin and the thermosetting resin (ionizing radiation-curable resin/thermosetting resin) is 95/5 to 40/60.

Further, according to another aspect of the present invention, a decorative sheet includes: a primary film; a transparent resin layer; and a surface protective layer, laminated in this order, wherein the surface protective layer is formed of a plurality of layers, a layer of the surface protective layer located on an outermost surface is a first surface protective layer, and a layer underlying the first surface protective layer is a second surface protective layer, and the first surface protective layer has an erosion rate E in a range of 0.1 µm/g or more and 0.4 µm/g or less, the erosion rate E being measured by using polygonal alumina particles having an average particle size ($D_{50}$) of 1.2 µm.

Further, according to still another aspect of the present invention, a decorative sheet includes: a primary film; a transparent resin layer; and a surface protective layer, laminated in this order, wherein the transparent resin layer has an erosion rate E in a range of 0.05 µm/g or more and 2 µm/g or less, the erosion rate E being measured by using polygonal alumina particles having an average particle size ($D_{50}$) of 1.2 µm.

Advantageous Effects of Invention

According to the decorative sheet of an aspect of the present invention, a decorative sheet having good scratch resistance under high load conditions can be provided.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

Figure 1:
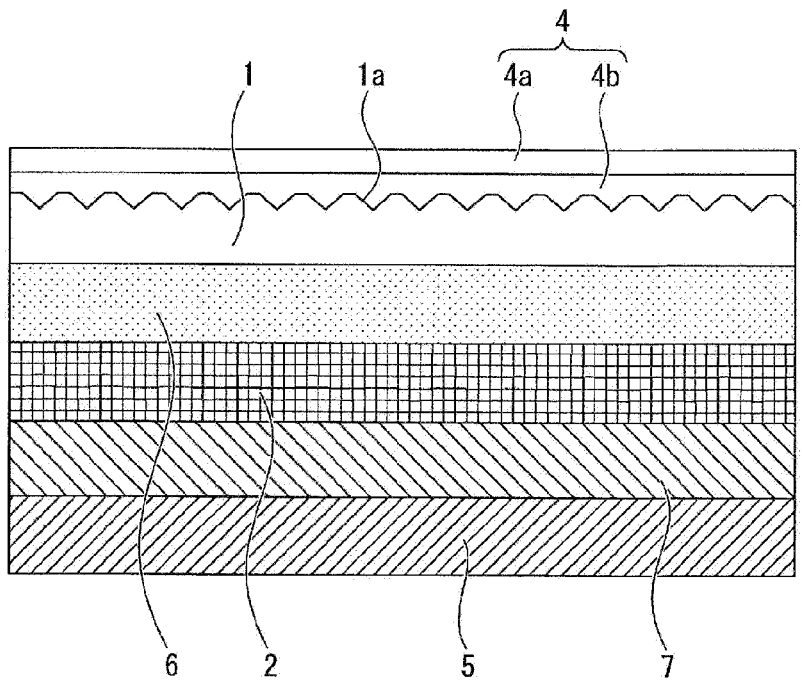
FIG. 1 is a schematic cross-sectional view illustrating an example configuration of a decorative sheet according to an embodiment of the present invention.
Figure 2:
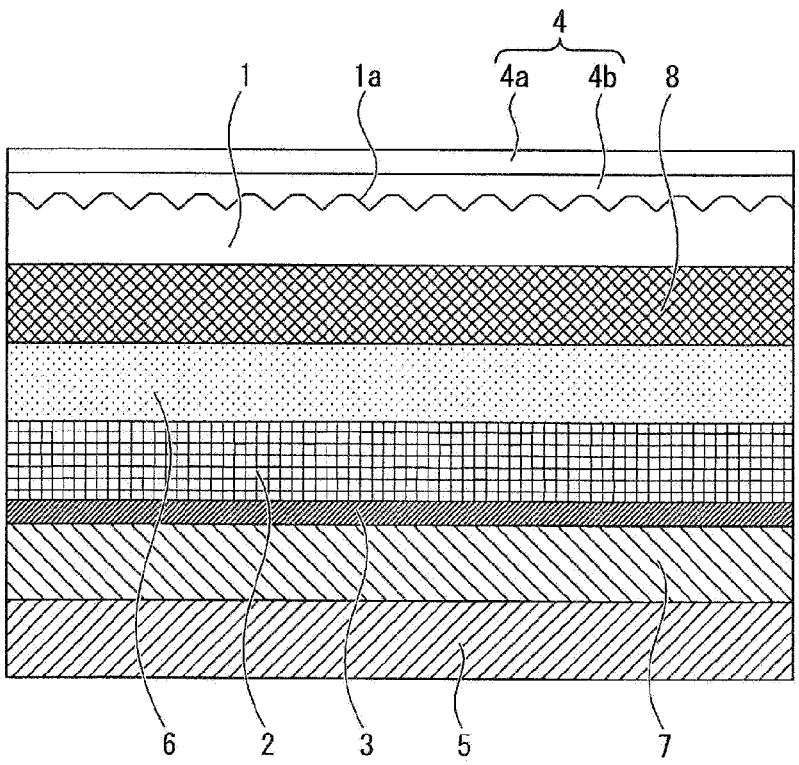
FIG. 2 is a schematic cross-sectional view illustrating an example configuration of a decorative sheet according to another embodiment of the present invention.

With reference to FIGS. 1 and 2, a decorative sheet according to an embodiment of the present invention will be described in detail.

(Measurement of Erosion Rate E)

First, an "erosion rate E" defined in the present embodiment will be described.

The erosion rate E in the present embodiment is a value measured by using, for example, a material surface precision tester (micro slurry jet erosion tester, hereinafter referred to as MSE tester, manufactured by Palmeso Co., Ltd./Product name: Nano MSE/model No. N-MSE-A). The specific method for measuring the erosion rate E is as follows.

Polygonal alumina powder (polygonal alumina particles) having an average particle size $D_{50}$=1.2 μm is dispersed in water to prepare a slurry containing 3 mass % of polygonal alumina powder to a total mass of slurry. A decorative sheet is fixed to a table so that a projection distance between the decorative sheet and a nozzle for spraying the slurry is set to 4 mm. The nozzle diameter is 1 mm×1 mm. Slurry containing polygonal alumina powder is sprayed from the nozzle so that the decorative sheet fixed to the table is eroded sequentially from a surface protective layer. The spray strength is determined based on a standard projection force X, which is obtained by performing erosion of an existing Si wafer or PMMA substrate in advance under the same experimental conditions and obtaining an amount of surface displacement due to the erosion relative to the sprayed amount of slurry (that is, a depth of cut due to spray of 1 g of slurry). In the present embodiment using polygonal alumina powder, a projection force by which an existing Si wafer is eroded by 6.360 μm/g is defined as a standard projection force X.

For polygonal alumina powder according to the present embodiment, a projection force of X=1/100 (projection force by which an existing Si wafer is eroded by 0.064 μm/g) is used.

After the eroded portion is washed with water, the eroded depth, that is, an erosion depth Z, is measured. The erosion depth Z is measured by using, for example, a stylus surface profilometer (manufactured by Kosaka Laboratory Ltd./ model No. PU-EU1/stylus tip R=2 μm/load 100 μN/measurement magnification 10,000/measurement length 4 mm/measurement speed 0.2 mm/sec). In the present embodiment, an erosion rate E [μm/g] is calculated by using the projection particle amount X' [g] and the erosion depth Z [μm] calculated by the above projection force.

It is known that the erosion rate E is not affected by the erosion rate E of an underlying layer in the depth direction in measurement of the erosion rate E. Therefore, in measurement of the erosion rate E, an MSE test may be performed in sequence from the first surface protective layer located on the outermost surface.

Further, in the present embodiment, an erosion rate E measured for a layer formed only of an ionizing radiation-curable resin and an erosion rate E measured for a layer formed only of a thermosetting resin are used for each erosion rate E of an ionizing radiation-curable resin and a thermosetting resin constituting the surface protective layer.

(Configuration of Decorative Sheet)

A configuration of the decorative sheet of the present invention will be described below. The present embodiment is described assuming that the surface protective layer is formed of two layers.

A decorative sheet shown in FIG. 1 includes a surface protective layer (first surface protective layer) 4a, a surface protective layer (second surface protective layer) 4b, a transparent resin layer 1, an adhesive layer 6 (heat-sensitive adhesive layer, anchor coat layer, adhesive for dry lamination layer), a pattern layer 2, a primary film layer 7, and a primer layer 5 in this order from the upper side of the drawing. More specifically, the decorative sheet of the present embodiment has a configuration in which the pattern layer 2 is provided on a first surface of the transparent resin layer 1, and a surface protective layer (surface protective layer 4a and surface protective layer 4b) 4 is provided on a second surface of the transparent resin layer 1.

A decorative sheet shown in FIG. 2 includes a surface protective layer (first surface protective layer) 4a, a surface protective layer (second surface protective layer) 4b, a transparent resin layer 1, an adhesive resin layer 8, an adhesive layer (heat-sensitive adhesive layer, an anchor coat layer, an adhesive for dry lamination layer) 6, a pattern layer 2, a primary film layer 7, and a primer layer 5. More specifically, the decorative sheet of the present embodiment has a configuration in which the pattern layer 2 and a concealing layer 3 are provided on a first surface of the transparent resin layer 1, and a surface protective layer 4 is provided on a second surface of the transparent resin layer 1.

Further, in order to improve the design, an embossed pattern 1a may be provided as appropriate on the surface protective layer 4b of the transparent resin layer 1.

The total thickness of the decorative sheet may be in the range of 80 μm or more and 250 μm or less.

Further, the decorative sheet of the present embodiment preferably does not contain a vinyl chloride resin. A decorative sheet using a non-vinyl chloride resin can reduce the risk of toxic gas emissions or the like during incineration.

The details of layers constituting the decorative sheet of the present embodiment will be described below.

<Primary Film Layer>

In order to impart design properties, scratch resistance, and post-processing resistance to the decorative sheet, the primary film layer (primary film) 7 may be made of a material appropriately selected from, for example, paper such as thin paper, titanium paper, and resin impregnated paper, synthetic resin such as polyethylene, polypropylene, polystyrene, polybutylene, polycarbonate, polyester, polyethylene terephthalate, polybutylene terephthalate, polyamide, ethylene-vinyl acetate copolymer, polyvinyl alcohol, and acrylic, or foams of these synthetic resins, rubber such as ethylene-propylene copolymer rubber, ethylene-propylene-diene copolymer rubber, styrene-butadiene-styrene block copolymer rubber, and polyurethane, an organic or inorganic nonwoven fabric, synthetic paper, and foil of metal such as aluminum, iron, gold, and silver. Further, the primary film layer 7 may be a sheet made of the same resin composition as that of the transparent resin layer 1. Among the above materials, polyolefin-based material such as polypropylene or polyethylene may be preferably used.

Examples of the polyolefin-based resin included in the primary film layer 7 may be, for example, in addition to polypropylene, polyethylene, polybutene, and the like, a homopolymer or a copolymer of one or more of α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc.), and a copolymer of ethylene or an α-olefin with another monomer, for example, an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, and the like.

When a substrate having an inert surface such as a polyolefin-based material is used as the primary film layer 7, front and rear surfaces of the primary film layer 7 are preferably subjected to a treatment such as a corona treatment, plasma treatment, ozone treatment, electron beam treatment, ultraviolet treatment, or bichromate treatment. Further, a primer layer (not shown) may be provided between the primary film layer 7 and the pattern layer 2 to ensure adhesion between these layers.

In order to impart concealing properties to the decorative sheet, a coloring sheet having concealing properties may be used as the primary film layer 7, or the concealing layer 3 may be provided as shown in FIG. 2 as a lower layer of the pattern layer 2 and an upper layer of the primary film layer 7. When the coloring sheet is used as the primary film layer 7, a resin material constituting the primary film layer 7 may be colored by adding a colorant. Examples of the colorant include inorganic pigments (such as titanium oxide and carbon black), organic pigments (such as phthalocyanine blue), and dyes. One or more known or commercially available colorants can be selected as the colorant of the present embodiment. Further, the additive amount can be adjusted to obtain desired concealing properties and design properties.

If necessary, various additives such as filler, foaming agent, flame retardant, lubricant, antistatic agent, antioxidant, crystal nucleating agent, ultraviolet absorber, photostabilizer, heat stabilizer, colorant, and matting agent may be added to the primary film layer 7.

In view of printability and cost, the thickness of the primary film layer 7 is preferably in the range of 30 μm or more and 150 μm or less.

<Pattern Layer and Concealing Layer>

The pattern layer 2 and the concealing layer 3 can be provided by performing, for example, gravure printing, offset printing, screen printing, flexographic printing, electrostatic printing, or ink jet printing onto the primary film layer 7 or the transparent resin layer 1. In particular, the concealing layer 3 may be provided by using, for example, a comma coater, knife coater, lip coater, metal deposition, or sputtering. In general, the concealing layer 3 is provided as an upper layer of the primary film layer 7 and a lower layer of the pattern layer 2.

When ink is used for forming the pattern layer 2, a binder contained in the ink can be appropriately selected from nitrocellulose, cellulose, vinyl chloride-vinyl acetate copolymer, polyvinyl butyral, polyurethane, acrylic, polyester, and modified products thereof. These may be any of aqueous, solvent, and emulsion types. Further, a one-part type or a two-part type which uses a hardener may be selected as appropriate.

In addition, ink can be cured by irradiation with ultraviolet light, electron beam, or the like. Among these, the most typical method is the use of a urethane-based ink cured by isocyanate.

In addition to these binders, colorants such as pigments and dyes, extender pigments, solvents, and various additives contained in general ink may be added. Examples of pigments that are particularly commonly used include condensed azo pigments, insoluble azo pigments, quinacridones, isoindolines, anthraquinones, imidazolones, cobalt, phthalocyanines, carbon, titanium oxide, iron oxide, and pearl pigments such as mica. Moreover, besides the application of ink, vapor deposition or sputtering of various metals can be performed to apply a design.

The material used for the concealing layer 3 may be basically the same as that of the pattern layer 2. Since the concealing layer 3 is required to impart concealing properties, the pigment used is preferably an opaque pigment such as titanium oxide or iron oxide. Further, in order to improve concealing properties, a metal such as gold, silver, copper, or aluminum can be added. Typically, aluminum flakes are often added. When the coating thickness, that is, the thickness of the concealing layer 3, is less than 2 μm, the concealing properties are not likely to be imparted, and when the thickness of the concealing layer 3 is more than 10 μm, a cohesive force of the resin layer tends to be reduced. Therefore, the thickness of the concealing layer 3 is suitably in the range from 2 μm or more and 10 μm or less.

<Adhesive Layer>

Any material can be selected for the adhesive layer 6, and examples of adhesion methods using the adhesive layer 6 include thermal lamination, extrusion lamination, dry lamination, and the like. An adhesive contained in the adhesive layer 6 can be selected from, for example, acrylic, polyester, and polyurethane based materials. Typically, the adhesive contained in the adhesive layer 6 is preferably a two-part curing type due to its cohesive force. In particular, a urethane-based material obtained by reaction of isocyanate with polyol is desirably used.

<Adhesive Resin Layer>

As shown in FIG. 2, an adhesive resin layer 8 may be provided between the adhesive layer 6 and the transparent resin layer 1. The adhesive resin layer 8 may be provided particularly when the extrusion lamination method requires more lamination strength. Typically, the transparent resin layer 1 and the adhesive resin layer 8 are laminated by a co-extrusion method.

The resin contained in the adhesive resin layer 8 may be, for example, polypropylene, polyethylene, acrylic resin, or the like modified with acid, and the thickness of the adhesive resin layer 8 is preferably 2 μm or more in view of improvement in adhesive force. When the thickness of the adhesive resin layer 8 is less than 2 μm, sufficient adhesive force is not likely to be obtained. Further, when the thickness of the adhesive resin layer 8 is too large, the adhesive resin layer 8 may be affected by its own softness, although the surface hardness is improved by the highly crystalline transparent resin layer 1. Accordingly, a thickness of 20 μm or less is preferred.

<Transparent Resin Layer>

The transparent resin layer 1 is formed on the adhesive layer 6 or the adhesive resin layer 8, and the transparent resin layer 1 of the present embodiment is a single layer. When the transparent resin layer 1 has a specific erosion rate E, a decorative sheet having good scratch resistance in a high load region can be provided.

The details of the transparent resin layer will be described below.

The transparent resin layer 1 is formed of a resin whose erosion rate E measured by using polygonal alumina powder having an average particle size ($D_{50}$) of 1.2 μm is adjusted in the range of 0.05 μm/g or more and 2 μm/g or less. When the transparent resin layer 1 has the erosion rate E of less than 0.05 μm/g, the scratch resistance is significantly reduced, which is not preferred. When the transparent resin layer 1 has the erosion rate E of more than 2 μm/g, the weather resistance and processability are significantly reduced, which is not preferred. Further, the erosion rate E of the transparent resin layer 1 measured by using polygonal alumina powder having an average particle size ($D_{50}$) of 1.2 μm is more preferably in the range of 0.1 μm/g or more and 2 μm/g or less.

The transparent resin layer 1 may be a sheet formed by film formation, or may be a laminate of pre-formed sheets. The transparent resin layer 1 may be formed of, for example, highly crystalline polypropylene resin.

Further, if necessary, one or both surfaces of the transparent resin layer 1 may be activated by, for example, corona treatment, plasma treatment, electron beam treatment, ultraviolet treatment, or bichromate treatment. If the concealing layer 3 has a problem in adhesion to a substrate (substrate such as a wooden board, an inorganic board, or a metallic plate, to which the decorative sheet is bonded), a primer layer 5 may be appropriately laminated.

When the transparent resin layer 1 is a sheet formed by film formation, for example, a method using an extruder is typically used.

The method of forming the transparent resin layer 1 by lamination is not specifically limited, and, for example, a method using heat and pressure, an extrusion lamination method, or a dry lamination method is typically used. Further, when an embossed pattern 1a is provided, a sheet once laminated by various methods may be subsequently embossed by applying, for example, heat and pressure, or a cooling roll on which an uneven pattern is formed may be used to emboss the sheet simultaneously with extrusion lamination. More specifically, the embossed pattern 1a is directly provided on the transparent resin layer 1, which may be, for example, a highly crystalline polypropylene sheet. The embossed pattern may be formed by using an embossed plate having an uneven pattern during application of heat and pressure to the sheet formed by film formation, or by using a cooling roll on which an uneven pattern is formed during film formation using an extruder to emboss the sheet simultaneously with cooling. Further, the embossed pattern 1a as an embossed portion may be filled with ink to improve the design.

The embossed pattern 1a may be provided as necessary, or may not be provided if unnecessary.

The thickness of the transparent resin layer 1 is preferably in the range of 40 μm or more and 170 μm of less. When the thickness of the transparent resin layer 1 is less than 40 μm, the weather resistance and scratch resistance may be reduced. When the thickness of the transparent resin layer 1 is more than 170 μm, the manufacturing cost may increase and the flexibility may decrease.

If necessary, for example, various additives such as thermal stabilizer, flame retardant, ultraviolet absorber, photostabilizer, anti-blocking agent, catalyst scavenger, and, within a range that does not impair the features of the present embodiment, colorant, light scattering agent, luster adjusting agent, and the like may be added to the transparent resin layer 1.

Typically, a combination of a thermal stabilizer such as phenol, sulfur, phosphorus, or hydrazine-based stabilizer, a flame retardant such as aluminum hydroxide or magnesium hydroxide, an ultraviolet absorber such as benzotriazole, benzoate, benzophenone, or triazine-based absorber, and a photostabilizer such as a hindered amine-based stabilizer is suitably used. Particularly, in use for this application, weather resistance needs to be considered. In this case, an ultraviolet absorber and a photostabilizer may be added to the transparent resin layer 1, and the suitable additive amount is in the range of 0.1 mass % or more and 2.0 mass % or less when the transparent resin layer 1 is 100 mass %.

Further, the transparent resin layer 1 may contain a crystal nucleating agent (nano-sized nucleating agent) which is subjected to vesicle formation treatment by a supercritical reverse phase evaporation method.

In a specific vesicle formation treatment by a supercritical reverse phase evaporation method, an aqueous phase is injected into a mixture fluid of carbon dioxide in a supercritical state, phospholipid as a dispersant, and an additive as an encapsulated substance, followed by stirring to generate an emulsion of carbon dioxide in a supercritical state and the aqueous phase. Then, once the pressure is reduced, the carbon dioxide expands and evaporates to cause a phase transition, and nanocapsules are formed in which the phospholipid in the form of a monolayer membrane covers the surface of the additive particles. Unlike the conventional encapsulation method in which the dispersant forms a multi-layer film on the surface of the additive particles, the supercritical reverse phase evaporation method enables capsules having a single layer film to be easily formed. Accordingly, capsules having smaller diameter can be prepared. Further, when multi-layer film capsules are desired, they can be easily formed by injecting supercritical carbon dioxide into a mixture fluid of phospholipid, an additive, and aqueous phase. Examples of the phospholipid used for preparation of vesicles include glycerophospholipids such as phosphatidylcholine, phosphatidylethanolamine, phosphatidylserine, phosphatidic acid, phosphatidylglycerol, phosphatidylinositol, cardiopine, yolk lecithin, hydrogenated yolk lecithin, soybean lecithin, and hydrogenated soybean lecithin, and sphingophospholipids such as sphingomyelin, ceramidephosphoryl ethanolamine, and ceramidephosphoryl glycerol. Since the vesicles have a phospholipid outer membrane, good miscibility with the resin material can be achieved.

When the transparent resin layer 1 is formed of a resin layer containing the nano-sized nucleating agent described above, it is important that a crystalline polypropylene resin in the range of 90 mass % or more and 100 mass % or less is included as a main component, and a nucleating agent is included as a nano-sized additive. More preferably, the nano-sized additive is included in the form of vesicles (nucleating agent vesicles). In this case, an average particle size of the nucleating agent vesicles is preferably ½ or less of the wavelength of visible light. Specifically, since the wavelength range of visible light is 400 to 750 nm, the average particle size of the nano-sized nucleating agent is preferably 375 nm or less. In such a transparent resin layer 1, it is preferable that the haze value is 15% or less, more preferably 10% or less, the tensile elasticity is in the range of 800 MPa or more and 2,000 MPa or less, and the tensile elongation at break is 200% or more by adjusting the cooling conditions during film formation.

Further, the crystalline polypropylene resin can be appropriately selected and designed from isotactic polypropylene and syndiotactic polypropylene having different pentad fractions, random polypropylene, block polypropylene, and a mixture thereof. More preferably, it is preferable that the crystalline polypropylene resin is a highly crystalline homopolypropylene resin that is a propylene homopolymer having an isotactic pentad fraction (mmmm fraction) of 95% or more, and more preferably 96% or more. In addition, resins other than crystalline polypropylene constituting the transparent resin layer 1 can be appropriately selected depending on the purpose of composition as long as they do not affect physical properties of the crystalline polypropylene to a significant degree. Such resins preferably have good miscibility with crystalline polypropylene resin constituting the transparent resin layer 1 in order to maintain suitability for V-groove processing.

Preferably, the transparent resin layer 1 has a thickness in the range of 20 μm or more and 250 μm or less. More preferably, the thickness is in the range of 40 μm or more and 170 μm or less.

Since the nano-sized nucleating agent has a significantly small nano particle diameter, the number and surface area of the particles of nucleating agent present per unit volume increase in inverse proportion to the cube of the particle diameter. As a result, when crystal growth occurs on the surface of one particle of the nucleating agent added to the polypropylene resin, the edge of the growing crystal immediately comes into contact with the edge of a crystal growing on the surface of an adjacent other nucleating agent particle due to a small distance between the nucleating agent particles. Since the edge of each crystal inhibits growth of the other crystal, the average particle size of spherulites in the crystal part of the crystalline polypropylene resin can be extremely small.

Therefore, due to the nano-sized nucleating agent contained in the transparent resin layer 1, finer and larger amounts of crystal nuclei are generated in the resin compared with conventional nucleating agents. As a result, the distance between the crystal nuclei in the crystal part can be reduced to suppress growth of the individual crystals, and the average particle size of the spherulites can be successfully reduced to an extremely small size. Such a crystalline polypropylene resin achieves significantly high transparency with the haze value of 15% or less.

Further, due to the nano-sized nucleating agent being contained in the form of vesicles, that is, contained as nucleating agent vesicles, the nucleating agent achieves high dispersibility in the resin material without causing aggregation. In the resin composition, the outer membrane of the nucleating agent vesicles are partially broken to expose the nucleating agent. Accordingly, in the crystallization process of the resin material, spherulites having nano-sized nucleating agent particles as crystal nuclei are formed.

In particular, the nucleating agent vesicles obtained by supercritical reverse phase evaporation method have an extremely small size. Thus, the average particle size of the spherulites in the crystal part of the crystalline polypropylene resin can be extremely small, and the crystallinity of the crystal part can be greatly improved.

In the decorative sheet of the present embodiment, due to the nano-sized nucleating agent, more preferably, nucleating agent vesicles being contained in the transparent resin layer 1, the average particle size of spherulites in the crystal part of the crystalline polypropylene resin can be extremely small to thereby achieve good scratch resistance. In particular, due to nucleating agent vesicles being contained in the transparent resin layer 1, nucleating agent can be uniformly dispersed in the crystalline polypropylene resin. Accordingly, the crystallinity of crystalline polypropylene can be controlled and adjusted to optimize the hardness and toughness of the transparent resin layer 1. Further, due to nucleating agent vesicles being contained in the transparent resin layer 1, good scratch resistance and post-processing resistance with the tensile elasticity in the range of 800 MPa or more and 2000 MPa or less and the tensile elongation at break of 200% or more can be achieved.

The terms used in the above description will be briefly described below.

The nucleating agent refers to an agent added to promote formation of crystal nuclei during crystallization of a resin, or to provide the nucleating agent itself as crystal nuclei. Nucleating agents include a melting type, which melts in the resin of a substrate when added thereto and then precipitates to form crystal nuclei, and a non-melting type, which does not melt when added to the resin of a substrate and forms crystal nuclei having the same particle size as in the original nucleating agent. Examples of the nucleating agent for polypropylene resins include phosphoric acid ester metal salts, benzoic acid metal salts, pimelic acid metal salts, rosin metal salts, benzylidene sorbitol, quinacridone, cyanine blue, and talc. Particularly, in the present embodiment, in order to maximize the effect of nanoization, it is preferred to use phosphoric ester metal salts, benzoic acid metal salts, pimelic acid metal salts, or rosin metal salts, which are of the non-melting type and expected to exhibit good transparency. Further, quinacridone, cyanine blue, talc, and the like, which are colored, may also be used when they can be made transparent by the nanoization. In addition, the non-melting nucleating agent may be used by being appropriately mixed with melting benzylidene sorbitol.

The haze value is a percentage value calculated by dividing a value (diffuse transmittance) by a total light transmittance, the diffuse transmittance being obtained by, when light enters a first surface of an object and exits a second surface thereof, subtracting an integral value (linear transmittance) of only a linear component of light exiting the second surface from a total integral value (total light transmittance) of light exiting the second surface. Therefore, the smaller the haze value, the higher the transparency. The haze value is determined by an internal haze, which depends on the internal state of the object such as crystallinity in the crystal part and spherulite size, and an external haze, which depends on the state of the object surface such as presence or absence of irregularity on a light-incident surface and a light-emitting surface. In the present embodiment, a value determined by the internal haze and the external haze is simply referred to as the haze value.

The isotactic pentad fraction (mmmm fraction) is calculated from a value (electromagnetic wave absorption ratio) obtained by making the resin material constituting the transparent resin layer 1 resonate at a predetermined resonance frequency using the $^{13}$C-NMR measurement method (nuclear magnetic resonance measurement method) using carbon C (nuclide) having a mass number of 13, and defines the atomic arrangement, the electronic structure, and the molecular microstructure in the resin material. The isotactic pentad fraction of the polypropylene resin is the ratio of five propylene units in a row determined by $^{13}$C-NMR, and it is used as a measure of crystallinity or stereoregularity. Such an isotactic pentad fraction is one of the important factors that mainly determine the scratch resistance of the surface. In principle, the higher the isotactic pentad fraction, the higher the degree of crystallinity of the sheet, thereby improving the scratch resistance.

<Surface Protective Layer>

The surface protective layer 4 of the present embodiment includes the surface protective layer 4a and the surface protective layer 4b. When the surface protective layer 4a has a specific erosion rate E, a decorative sheet having an excellent surface scratch resistance can be provided.

Further, when the surface protective layer 4a of the present embodiment further has a specific coating film thickness and a static friction coefficient, and contains an inorganic filler subjected to hydrophobic treatment and having strong bonding with the surface protective layer 4a, a decorative sheet having an even more excellent surface scratch resistance can be provided.

The details of the surface protective layer 4 will be described below.

The surface protective layer 4 is formed of a plurality of layers. When a layer of the surface protective layer 4 located on the outermost surface is defined as a "first surface protective layer 4a", and a layer underlying the first surface protective layer 4a is defined as a "second surface protective layer," the first surface protective layer 4a has an erosion rate E in a range of 0.1 µm/g or more and 0.4 µm/g or less, the erosion rate E being measured by using polygonal alumina particles having an average particle size ($D_{50}$) of 1.2 µm. When the erosion rate E of the surface protective layer 4a is less than 0.1 µm/g, there is a risk of poor adhesion to the surface protective layer 4b due to small erosion rate E. This may lead to a reduced impact resistance. When the erosion rate E of the surface protective layer 4a is more than 0.4 µm/g, the scratch resistance tends to be poor.

The surface protective layer 4a of another embodiment includes one or more ionizing radiation-curable resins having an erosion rate E, measured by using polygonal alumina powder having an average particle size ($D_{50}$) of 1.2 µm, in a range of 0.10 µm/g or more and 0.45 µm/g or less, and one or more thermosetting resins having an erosion rate E, measured by using polygonal alumina powder having an average particle size ($D_{50}$) of 1.2 µm, in a range of 0.30 µm/g or more and 0.6 µm/g or less. Further, a mass ratio between the ionizing radiation-curable resin and the thermosetting resin (ionizing radiation-curable resin/thermosetting resin) constituting the surface protective layer 4a is 95/5 to 40/60. When the erosion rate E of the ionizing radiation-curable resin is less than 0.10 µm/g, the erosion rate E of the thermosetting resin is less than 0.30 µm/g, and the ratio of the thermosetting resin is less than 5%, weather resistance is significantly reduced, which is not preferred. When the erosion rate E of the ionizing radiation-curable resin is more than 0.45 µm/g, the erosion rate E of the thermosetting resin is more than 0.6 µm/g, and the ratio of the thermosetting resin is more than 60%, scratch resistance is significantly reduced, which is not preferred. The surface protective layer 4a and the surface protective layer 4b may be made of different resins.

Further, when the surface protective layer 4a includes the ionizing radiation-curable resin and the thermosetting resin, the surface protective layer 4a preferably has the erosion rate E, measured by using polygonal alumina powder having an average particle size ($D_{50}$) of 1.2 µm, in a range of 0.2 µm/g or more and 0.45 µm/g or less. When the surface protective layer 4a has the erosion rate E of less than 0.2 µm/g, the weather resistance is significantly reduced, which is not preferred. When the surface protective layer 4a has the erosion rate E of more than 0.45 µm/g, the scratch resistance is significantly reduced, which is not preferred.

The thickness of the surface protective layer 4a may be in a range of 2 µm or more and 7 µm or less. When the thickness of the surface protective layer 4a is less than 2 µm, the coating method is limited, and stable production becomes difficult, leading to a decrease in the productivity. Further, the weather resistance and the scratch resistance are reduced, and non-uniformity may increase. When the thickness of the surface protective layer 4a is more than 7 µm, the balance between performance and cost is lost, leading to an increase in the cost. In addition, the flexibility may decrease.

The thickness of the surface protective layer 4b may be in a range of 2 µm or more and 14 µm or less. When the thickness of the surface protective layer 4b is less than 2 µm, the coating method is limited, and stable production becomes difficult, leading to a decrease in the productivity. Further, the weather resistance and the scratch resistance are reduced, and non-uniformity may increase. When the thickness of the surface protective layer 4b is more than 14 µm, the balance between performance and cost is lost, leading to an increase in the cost. In addition, the flexibility may decrease.

The thickness of the entire surface protective layer 4 may be in a range of 4 µm or more and 21 µm or less. When the thickness of the entire surface protective layer 4 is less than 4 µm, the coating method is limited, and stable production becomes difficult, leading to a decrease in the productivity. Further, the weather resistance and the scratch resistance are reduced, and non-uniformity may increase. When the thickness of the entire surface protective layer 4 is more than 21 µm, the balance between performance and cost is lost, leading to an increase in the cost. In addition, the flexibility may decrease.

A static friction coefficient µs (compliant with JIS K 7125) of the decorative sheet, that is, the surface protective layer 4a of the present embodiment, may be in a range of 0.25 or more and 0.5 or less. When the static friction coefficient µs of the surface protective layer 4a is less than 0.25, a surface of the surface protective layer 4a, which is an outermost surface of the decorative sheet, is slippery, and less likely to be damaged under high load conditions. However, this may not be suitable for use as a floor material, since it increases the risk of a person slipping. When the static friction coefficient μs of the surface protective layer 4a is more than 0.5, the friction between a sheet surface and an object coming into contact with the sheet surface increases. Accordingly, the surface tends to be damaged under high load conditions.

The methods for providing surface protective layer 4 are not limited in any way, as with the methods for providing the concealing layer 3 and the pattern layer 2.

The surface protective layer 4 preferably includes a resin curable by irradiation with ultraviolet light or electron beam, that is, an ionizing radiation-curable resin, and a resin curable by irradiation with heat, that is, a thermosetting resin. More specifically, the surface protective layer 4 preferably includes one or more ionizing radiation-curable resins and one or more thermosetting resins. A content of the ionizing radiation-curable resin may be in a range of 65 parts by mass or more and 100 parts by mass or less when a resin constituting the surface protective layer 4, more specifically the surface protective layer 4a, is 100 parts by mass. When the content of the ionizing radiation-curable resin is less than 65 parts by mass, the erosion rate E increases, leading to a decrease in scratch resistance.

The thermosetting resin may be selected as appropriate from polyurethane-based materials, acrylic-based materials, acrylic silicon-based materials, fluorine-based materials, epoxy-based materials, vinyl-based materials, polyester-based materials, melamine-based materials, aminoalkyd-based materials, urea-based materials, and the like. These may be in any form such as aqueous, emulsion, or solvent type, and may be any curable type such as a one-part type or a two-part type which uses a hardener. In particular, a urethane-based top coat using isocyanate reaction is desirable from the viewpoint of workability, cost, cohesive force of the resin itself, and the like.

The isocyanate may be appropriately selected from adduct, biuret, and isocyanurate hardeners, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), bis(isocyanatomethyl) cyclohexane (HXDI), and trimethylhexamethylene diisocyanate (TMDI), and various prepolymers. In view of weather resistance, hardeners based on hexamethylene diisocyanate (HMDI) or isophorone diisocyanate (IPDI) having a linear molecular structure are preferably used.

The ionizing radiation-curable resin may be appropriately selected from polyester acrylate, epoxy acrylate, urethane acrylate, and acrylic acrylate-based resins. In particular, urethane acrylate and acrylic acrylate-based resins, having good weather (light) resistance, are preferably used. The curing method of the ionizing radiation-curable resin is preferably curing by ionizing radiation such as ultraviolet light or electron beam from the viewpoint of workability.

The electron beam source may be, for example, a light source such as a super high-pressure mercury lamp, high pressure mercury lamp, low pressure mercury lamp, carbon arc lamp, black light, or metal halide lamp. The wavelength of ultraviolet light is preferably in a range of 180 to 400 nm.

A mixture of the thermosetting resin and the ionizing radiation-curable resin may be, for example, preferably a mixture of a urethane-based resin obtained by reacting an acrylic polyol with an isocyanate as a thermosetting resin, and a urethane acrylate-based resin as an ionizing radiation-curable resin. Using a mixture of the thermosetting resin and the ionizing radiation-curable resin can improve surface hardness and enhance at least one of suppression of cure shrinkage and adhesion of inorganic microparticles (inorganic filler).

The ionizing radiation-curable resin constituting the surface protective layer 4, specifically the first surface protective layer 4a, contains one or more components having 6 or more functional groups and a mass average molecular weight of 1,000 or more. More preferably, one or more components having 6 or more functional groups and a mass average molecular weight of 1,000 or more and 20,000 or less may be used. When the ionizing radiation-curable resin has less than 6 functional groups, the crosslinking density decreases and thus the scratch resistance is significantly reduced, which is not preferred. When the ionizing radiation-curable resin has a mass average molecular weight of less than 1,000, the surface state during coating is significantly deteriorated, which is not preferred. When the ionizing radiation-curable resin has a mass average molecular weight of more than 20,000, the viscosity of coating liquid increases and thus the coating suitability is significantly reduced, which is not preferred.

A resin other than the ionizing radiation-curable resin, for example, a thermosetting resin has an erosion rate E larger than that of the ionizing radiation-curable resin.

Further, in order to improve weather resistance, an ultraviolet absorber and a photostabilizer may be appropriately added to the surface protective layer 4, more specifically the surface protective layer 4a. In addition, in order to impart various functions, functional additives such as antimicrobial agent and antifungal agent can be suitably added.

In the present embodiment described above, the surface protective layer 4 is formed of a resin containing an ionizing radiation-curable resin and a thermosetting resin. However, the present embodiment is not limited thereto. The surface protective layer 4 may be a layer formed only of an ionizing radiation-curable resin, or a layer formed only of a thermosetting resin.

Preferably, an inorganic filler is added to the surface protective layer 4 for improvement of surface scratch resistance or adjustment of gloss associated with the design.

Examples of the inorganic filler to be added include alumina, silica, boehmite, iron oxide, magnesium oxide, aluminosilicate, diamond, silicon nitride, silicon carbide, glass beads, calcium titanate, barium titanate, magnesium pyroborate, zinc oxide, silicon nitride, zirconium oxide, chromium oxide, iron oxide, and glass fiber. The inorganic filler may be inorganic microparticles have an average particle size in a range of 1 μm or more and 30 μm or less, and more specifically in a range of 1 μm or more and 10 μm or less. When the average particle size of the inorganic filler is less than 1 μm, it may be difficult to obtain a matting effect. This is because that, in order to exhibit the matting effect, ideally the average particle size of the inorganic filler is the same or larger than the thickness of the film (layer) to which the inorganic filler is added. When the average particle size of the inorganic filler is more than 30 more preferably more than 10 the inorganic filler tends to detach from the surface protective layer 4 under high load conditions, which causes deteriorated appearance of the surface due to a change in gloss.

For example, when gravure printing is selected, a suitable coating thickness of one layer is typically 2 μm to 12 In this case, as described above, it is preferred to select an inorganic filler having an average particle size smaller than or equal to the thickness that can be applied in a single coating process. However, when the surface protective layer 4 is formed of a plurality of layers, an inorganic filler having an average particle size larger than the film thickness of the surface protective layer 4b, which is located in a lower layer, can be added.

A content of the inorganic filler may be in a range of 1 part by mass or more and 20 parts by mass or less when a resin constituting the surface protective layer 4a is 100 parts by mass. When the content of the inorganic filler is less than 1 part by mass, scratch resistance may be reduced. When the content of the inorganic filler if more than 20 parts by mass, the gloss of the surface is significantly reduced, which may impair the design. Furthermore, weather resistance and stain resistance may be reduced.

Preferably, the inorganic filler is subjected to a surface treatment. The surface treatment applied to the inorganic filler can strengthen bonding to the surface protective layer 4. In addition, an inorganic filler having an untreated surface can be added to the surface protective layer 4 located in a lower layer, such as the surface protective layer 4b.

Further, when a surface treatment is applied, a functional group that imparts hydrophobicity to the surface of the inorganic filler and reactivity with the surface protective layer 4 is desired. That is, a surface treatment agent applied to the surface of the inorganic filler preferably has a reactive group that reacts with the base resin constituting the surface protective layer 4, more specifically the surface protective layer 4a.

The method for performing the surface treatment of the inorganic filler is not specifically limited, and a known method can be selected.

The surface treatment agent used for the surface treatment of the inorganic filler may be at least one of a surfactant, a fatty acid metal salt, a silane coupling agent, a silicone, a wax, and a modified resin. Examples of the surface treatment agent of the present embodiment include silicone oil-based agent, alkylsilazane-based agent, trimethylsilylation agent, alkoxysilane-based agent, siloxane, silane coupling agent, titanium coupling agent, and phosphoric acid-based or fatty acid-based surfactant. They can be used singly or in combination.

Examples of the silicone oil-based treatment agent include straight silicone oil (dimethyl silicone oil, methylphenyl silicone oil, or the like) and modified silicone oil (amino acid modified, epoxy modified, carboxyl modified, carbinol modified, methacryl modified, mercapto modified, phenol modified, one terminal reactive modified, different functional group modified, polyether modified, methylstyryl modified, alkyl modified, higher fatty acid ester modified, hydrophilic special modified, higher alkoxy modified, higher fatty acid-containing modified, or fluorine modified silicone oil, or the like).

Examples of the alkylsilazane-based treatment agent include hexamethyldisilazane, and vinylsilazane.

Examples of the silane coupling agent include alkoxysilane compounds such as methyltrimethoxysilane, dimethyldimethoxysilane, trimethylmethoxysilane, meghyltriethoxysilane, dimethyldiethoxysilane, trimethylethoxysilane, n-hexyltrimethoxysilane, n-hexyltriethoxysilane, n-hexyltriethoxysilane, n-octyltriethoxysilane, n-hexyltriethoxysilane, decyltriethoxysilane, phenyltriethoxysilane, benzyltriethoxysilane, propyltrimethoxysilane, propyltriethoxysilane, diethoxymethyl phenylsilane, allyltriethoxysilane, vinyltrimethoxysilane, vinyltriethoxysilane, aminopropyltriethoxysilane, and aminopropyltrimethoxysilane, and chlorosilane compounds such as trimethylchlorosilane, and diethyldichlorosilane.

Examples of the trimethylsilylation agent include alkoxysilane compounds in the silane coupling agents.

Examples of the titanate coupling agent include isopropyltridecyl benzene sulfotitanate, isopropyltris(dioctylpyrophosphate)titanate, tetraisopropylbis(dioctylphosphite)titanate, tetraoctylbis(ditridecylphosphite)titanate, tetra(2,2 diallyloxymethyl-1 butyl)bis(ditridecyl)phosphite titanate, bis(dioctyl pyrophosphate)oxyacetate titanate, and the like.

Examples of the aluminate coupling agent include acetoalkoxyaluminum diisopropylate, and the like.

Examples of the surfactant include anionic, cationic, nonionic, and amphoteric surfactants.

In order to improve the reaction rate during a surface treatment, the above surface treatment agents can be subjected to a treatment to form vesicles by the above supercritical reverse phase evaporation method, which are then dispersed to be used for the surface treatment.

The surface treatment can be performed by a known method by using the surface treatment agent that has been treated by the supercritical reverse phase evaporation method to thereby obtain a good surface treatment filler.

As described above, one of the features (matters defining the invention) of the decorative sheet of the present embodiment is that "a surface treatment agent used for a surface treatment of the inorganic filler is made of surface treatment agent-encapsulating vesicles, which are obtained by encapsulating the surface treatment agent in vesicles by a supercritical reverse phase evaporation method." Then, the surface treatment agent in the state of being encapsulated in the vesicles is reacted with the inorganic filler. This exhibits an effect of greatly improving reactivity of the surface treatment agent with the inorganic filler. However, specifying such a feature directly from the structure or the properties of the object in the state of the completed decorative sheet may be assumed to be difficult depending on the situation, and may be considered to be impractical. The reasons for this are as follows. The added surface treatment agent in the form of vesicles is dispersed with high dispersibility and reacts with the inorganic filler with high reaction probability. However, after preparing a transparent protective layer by reacting the surface treatment agent in the form of vesicles with the inorganic filler, in the step of preparing the decorative sheet, in which the laminate is typically subjected to various types of processing such as compression and curing, the outer membrane of the vesicles encapsulating the surface treatment agent may be crushed or chemically reacted due to such processing. Accordingly, there is a high probability that the surface treatment agent is not contained (covered) in the outer membrane, and the state of the outer membrane being crushed or chemically reacted differs depending on the processing applied to the decorative sheet. It is difficult to specify the situation, such as that the surface treatment agent is not contained in the outer membrane, from a numerical range of the physical properties per se. Further, it may also be difficult to determine whether the constituent material of the crushed outer membrane is the outer membrane of the vesicles or a material which is added separately from the surface treatment agent. Thus, while the present invention is different from the conventional art in that the reactivity of the surface treatment agent with the inorganic filler is greatly improved, it may be impractical to specify whether this is attributed to the fact that the surface treatment agent in the form of vesicles has been added, from a numerical range that can be analyzed based on the measurements of structure and properties of the decorative sheet.

As described above, the method for applying the surface treatment to the inorganic filler is not specifically limited. In general, the surface treatment method may be a dry method, a wet method, or an integral blend method. In the dry method, a surface treatment agent diluted with water or an organic solvent is added to the inorganic filler having an untreated surface by spraying or the like. The mixture thus obtained is stirred and aged to cause the reaction to proceed and obtain a surface treatment filler.

Furthermore, when the embossed pattern 1a is provided on the surface of the transparent resin layer 1 facing the surface protective layer 4, it is also possible to embed an ink constituting the surface protective layer 4a into the embossed pattern 1a by wiping so that the design is improved.

From the viewpoint of weather resistance, in order to protect the transparent resin layer 1 as a substrate, it is possible to impart weather resistance to each of the surface protective layer 4 and the transparent resin layer 1 as described above. In addition, in order to protect the pattern layer 2, it is also possible to add an ultraviolet absorber and a photostabilizer to each of the adhesive resin layer 8, the adhesive layer 6, and the pattern layer 2 itself.

The additive amount of the photoinitiator is not specifically limited, and is preferably approximately 0.1 to 15 parts by mass when the base resin is 100 parts by mass.

The type of photoinitiator is not specifically limited. In the case of resins having a radical polymerizable unsaturated group, the photoinitiator may be, for example, at least one of acetophenone-based or benzophenone-based material, thioxanthones, benzoin, benzoin methyl ether, Michler's benzoylbenzoate, Michler's ketone, diphenyl sulfide, dibenzyl disulfide, diethyloxide, triphenyl biimidazole, isopropyl-N,N dimethylaminobenzoate, and the like. In addition, it is desirable to design a combination of a plurality of types according to the light source and production environment.

Further, in the case of resins having a cationic polymerizable group, a photoinitiator may be, for example, at least one of aromatic diazonium salt, aromatic sulfonium salt, metallocene compound, benzoin sulfonic acid ester, furyloxysulfoxonium diaryliodonium salt, and the like.

<Primer Layer>

The material used for the primer layer 5 may be basically the same material as those of the pattern layer 2 and the concealing layer 3. Considering the web handling, since the primer layer 5 is applied on the rear surface of the decorative sheet 1, an inorganic filler such as silica, alumina, magnesia, titanium oxide, or barium sulfate may be added to the primer layer 5 to prevent blocking and improve adhesion to an adhesive. The coating thickness, that is, the thickness of the primer layer 5, for the purpose of ensuring adhesion to the primary film layer 7 as a substrate is suitably in a range of 0.1 µm or more and 10.0 µm or less, and more preferably in a range of 0.1 µm or more and 3.0 µm or less.

The primer layer 5 is necessary when the primary film layer 7, such as that made of an olefin-based material, has an inactive surface, but is not necessary when the substrate has an active surface.

EXAMPLES

First Example

Specific examples of the decorative sheet of the present invention will be described below.

In Examples 1-1 to 1-4, and Comparative Examples 1-1 to 1-2, the layers other than the surface protective layer 4a were made of the same materials, and the surface protective layer 4b and layers thereunder were formed by the following method.

<Preparation of Transparent Resin Layer>

A resin, in which 0.5 parts by mass of hindered phenol-based antioxidant (Irganox 1010; manufactured by BASF Corporation), 0.5 parts by mass of triazine-based ultraviolet absorber (CYASORB UV-1164; manufactured by SUNCHEM), and 0.5 parts by mass of NOR type photostabilizer (Tinuvin XT850 FF; manufactured by BASF Corporation) were blended with 100 parts by mass of highly crystalline homopolypropylene resin, was extruded by using a melt extruder to thereby obtain a 100-µm thick transparent resin sheet made of highly crystalline polypropylene, which was used as a transparent resin layer 1. Then, both surfaces of the transparent resin sheet thus formed were subjected to a corona treatment to provide the surface with a wetting tension of 40 dyn/cm or higher.

<Preparation of Pattern Layer and Primer Layer onto Primary Film Layer>

A pattern was printed on a first surface of an 80 µm-thick polyethylene sheet (primary film layer 7) having concealing properties by gravure printing using a two-part type urethane ink (V180; manufactured by Toyo Ink Co., Ltd.) to thereby provide a pattern layer 2, and a primer layer 5 was provided on a second surface of the primary film layer 7.

<Bonding of Transparent Resin Layer and Pattern Layer>

Then, the transparent resin layer 1 was bonded to a surface of the pattern layer 2 of the primary film layer 7 by a dry lamination method via the adhesive layer 6 made of an adhesive for dry lamination (TAKELAC A540; manufactured by Mitsui Chemicals, Inc., applied amount 2 g/m$^2$).

<Preparation of Embossed Pattern>

A surface of the transparent resin layer 1 of the sheet thus laminated was subjected to pressing by using an embossing roll die to form an embossed pattern 1a.

<Preparation of Top Coat Agent D Used for Surface Protective Layer 4b>

A top coat agent D used for Examples 1-1 to 1-4 and Comparative Examples 1-1 to 1-2 contained a thermosetting resin D as a base resin. The thermosetting resin D was an acrylic polymer having a glass transition temperature of approximately 100° C., a mass average molecular weight Mw of approximately 60,000, and a hydroxyl group value of 16. The top coat agent D was prepared by blending 5 parts of Tinuvin 479 (manufactured by BASF Corporation) as an ultraviolet absorber, 3 parts of Tinuvin 123 (manufactured by BASF Corporation) as a photostabilizer, 50 parts of ethyl acetate as dilution solvent, 15 parts of inorganic filler L-121 (manufactured by AGC Si-Tech Co., Ltd.) as a gloss adjusting agent, and 5 parts of DURANATE TAP-100 (manufactured by Asahi Kasei Corp.) as a curing agent with 100 parts of the base resin.

<Preparation of Surface Protective Layer 4b>

After the embossed pattern 1a was formed on the transparent resin layer 1, the top coat agent D was applied at 10 g/m$^2$ to the transparent resin layer 1 to form a surface protective layer 4b.

The surface protective layer 4a in Examples 1-1 to 1-4 and Comparative Examples 1-1 to 1-2 was formed by the following method.

<Preparation of Top Coat Agents A, B, and C Used for Surface Protective Layer 4a>

Top coat agents A, B, and C used for Examples 1-1 to 1-4 and Comparative Example 1-2 contained an ionizing radiation-curable resins A, B, and C, respectively, as base resins. The ionizing radiation-curable resins A, B, and C, were polyfunctional urethane acrylate oligomers having 3 to 15 functional groups, 2 to 9 functional groups, and 1 to 6 functional groups, respectively. The top coat agents A, B, and C were prepared by blending 5 parts of Tinuvin 479 (manufactured by BASF Corporation) as an ultraviolet absorber, 3 parts of Tinuvin 123 (manufactured by BASF Corporation) as a photostabilizer, 8 parts of Sylophobic 702 (manufactured by Fuji Silysia Chemical Ltd.) as a gloss adjusting agent, and 50 parts of ethyl acetate as a dilution solvent with 100 parts of each base resin.

Comparative Example 1-1

The thermosetting top coat agent D was applied at 5 g/m² to a surface of the surface protective layer 4b to form a surface protective layer 4a of Comparative Example 1-1.

Comparative Example 1-2

The ionizing radiation-curable top coat agent A, the top coat agent B, and the thermosetting top coat agent D were blended at 24:6:70, and applied at 5 g/m² to a surface of the surface protective layer 4b to form a surface protective layer 4a of Comparative Example 1-2.

Example 1-1

The ionizing radiation-curable top coat agent A, the top coat agent B, and the thermosetting top coat agent D were blended at 40:10:50, and applied at 5 g/m² to a surface of the surface protective layer 4b to form a surface protective layer 4a of Example 1-1.

Example 1-2

The ionizing radiation-curable top coat agent A, the top coat agent B, and the thermosetting top coat agent D were blended at 64:16:20, and applied at 5 g/m² to a surface of the surface protective layer 4b to form a surface protective layer 4a of Example 1-2.

Example 1-3

The ionizing radiation-curable top coat agent A and the thermosetting top coat agent D were blended at 80:20, and applied at 5 g/m² to a surface of the surface protective layer 4b to form a surface protective layer 4a of Example 1-3.

Example 1-4

The ionizing radiation-curable top coat agent C and the thermosetting top coat agent D were blended at 80:20, and applied at 5 g/m² to a surface of the surface protective layer 4b to form a surface protective layer 4a of Example 1-4.

The decorative sheets obtained in Examples 1-1 to 1-4 and Comparative Examples 1-1 to 1-2 were each bonded to a wood substrate via a urethane-based adhesive. Then, the surface hardness was determined by a Hoffman scratch test, a coin scratch test, and a steel wool rubbing test. Tables 1 and 3 show the evaluation results.

TABLE 1

| Resin composition | Tg | Functional group number | Mw | Erosion rate Polygonal |
|---|---|---|---|---|
| A | UV | 3 to 15 | 2800 | 0.24 |
| B | UV | 2 to 9 | 500 | 0.30 |
| C | UV | 1 to 6 | 1500 | 0.28 |
| D | Heat | 100 | 60000 | 0.39 |

TABLE 2

| | Top coat agent (resin composition) | | | | Erosion rate | Hoffman | Coin | Steel |
|---|---|---|---|---|---|---|---|---|
| | | A | B | C | D | Polygonal | scratch | scratch | wool |
| Comparative Example 1-1 | D | | | | 100 | 0.52 | Poor | Poor | Poor |
| Comparative Example 1-2 | ABD | 24 | 6 | | 70 | 0.49 | Poor | Poor | Poor |
| Example 1-1 | ABD | 40 | 10 | | 50 | 0.39 | Good | Good | Fair |
| Example 1-2 | ABD | 64 | 16 | | 20 | 0.31 | Excellent | Excellent | Good |

TABLE 3

| | Top coat agent (resin composition) | | | | Erosion rate | Hoffman | Coin | Steel |
|---|---|---|---|---|---|---|---|---|
| | | A | B | C | D | Polygonal | scratch | scratch | wool |
| Example 1-3 | AD | 80 | | | 20 | 0.35 | Good | Good | Fair |
| Example 1-2 | ABD | 64 | 16 | | 20 | 0.31 | Excellent | Excellent | Good |
| Example 1-4 | CD | | | 80 | 20 | 0.48 | Fair | Fair | Fair |

The test method for evaluation will be briefly described below.

<Hoffman Scratch Test>

Hoffman scratch testing was performed by using a Hoffman scratch hardness tester (manufactured by BYK-Gardner). A surface of the decorative sheet bonded to a wood substrate was scratched with a scratch length of 5 cm, a load of every 200 g from 200 g to 2000 g, and at a constant speed. The loads at which the surface of the decorative sheet was damaged were as follows.

Excellent: Hoffman scratch 1600 g or more
Good: Hoffman scratch 1200 g or more and 1600 g or less
Fair: Hoffman scratch 600 g or more and less than 1200 g
Poor: Hoffman scratch less than 600 g In the Hoffman scratch test, "Excellent," "Good," and "Fair" were judged as passes.

<Coin Scratch Test>

The coin scratch test was performed by using a 100 or 10 yen coin. The coin was fixed to a decorative sheet at an angle of 45±1°, and slid 5 cm while a load from 1 kg to 5 kg was applied to the coin (1 to 4 kg for a 10 yen coin, and 5 kg for a 100 yen coin) to determine whether a scratch mark of 3 mm or more was formed on the decorative sheet. The loads at which a scratch mark was formed were regarded as the surface hardness of the decorative sheet.

Excellent: Coin scratch 3 kg or more
Good: Coin scratch 2 kg or more and less than 3 kg
Fair: Coin scratch 1 kg or more and less than 2 kg
Poor: Coin scratch less than 1 kg In the coin scratch test, "Excellent," "Good," and "Fair" were judged as passes.

<Steel Wool Rubbing Test>

The steel wool rubbing test was performed by using a steel wool. The steel wool was placed in contact with a surface of a decorative sheet bonded to a wood substrate by a jig and fixed thereto. The steel wool was slid at a constant speed under conditions of a distance of 50 mm and 50 reciprocations while a load of 500 g/cm$^2$ was applied to the jig. Whether the surface of the decorative sheet was damaged or not was visually observed. The steel wool used was BON STAR #0 (manufactured by Nippon Steel Wool Co., Ltd.), crumpled to a 1 cm diameter.

Excellent: No gloss change or scratching
Good: Slight gloss change observed, but no scratches found
Fair: Gloss change and slight scratches found
Poor: Gloss change and a large number of scratches found In the steel wool rubbing test, "Excellent," "Good," and "Fair" were judged as passes.

As seen from Tables 2 and 3, the results of the decorative sheets according to Examples 1-1 to 1-4 of the present invention were well-balanced in scratch resistance.

When the resin composition of the surface protective layer 4$a$ includes 80% or more of the ionizing radiation-curable resin or a resin having a high crosslinking density, the erosion rate E was small and the scratch resistance was particularly good.

Second Example

Specific examples of the decorative sheet of the present invention will be described below.

In Examples 2-1 to 2-2, and Comparative Examples 2-1 to 2-2, the layers other than the transparent resin layer were made of the same materials, and formed by the following method.

<Preparation of Transparent Resin Layer>

A resin, in which 0.5 parts by mass of hindered phenol-based antioxidant (Irganox 1010; manufactured by BASF Corporation), 0.5 parts by mass of triazine-based ultraviolet absorber (CYASORB UV-1164; manufactured by SUNCHEM), and 0.5 parts by mass of NOR type photostabilizer (Tinuvin XT850 FF; manufactured by BASF Corporation) were blended with 100 parts by mass of highly crystalline homopolypropylene resin, was extruded by using a melt extruder to thereby obtain a 100-μm thick transparent resin sheet made of highly crystalline polypropylene, which was used as a transparent resin layer 1. Thus, transparent resin sheets A, B, C, and D in which the crystallinity of highly crystalline polypropylene was controlled and the erosion rate E was adjusted were formed.

Examples 2-1 to 2-2 and Comparative Examples 2-1 to 2-2 were formed by the following method.

Comparative Example 2-1

The transparent resin sheet A was formed in which the erosion rate E was adjusted to 0.047 μm/g.

Example 2-1

The transparent resin sheet B was formed in which the erosion rate E was adjusted to 0.52 μm/g.

Example 2-2

The transparent resin sheet C was formed in which the erosion rate E was adjusted to 1.4 μm/g.

Comparative Example 2-2

The transparent resin sheet D was formed in which the erosion rate E was adjusted to 2.1 μm/g.

Then, both surfaces of the respective transparent resin sheets thus formed were subjected to corona treatment to provide the surface with a wetting tension of 40 dyn/cm or higher.

<Preparation of Pattern Layer and Primer Layer onto Primary Film Layer>

A pattern was printed on a first surface of an 80 μm-thick polyethylene sheet (primary film layer 7) having concealing properties by gravure printing using a two-part type urethane ink (V180; manufactured by Toyo Ink Co., Ltd.) to thereby provide a pattern layer 2, and a primer layer 5 was provided on a second surface of the primary film layer 7.

<Bonding of Transparent Resin Layer and Pattern Layer>

The transparent resin sheets A, B, C, and D in which the erosion rate E was adjusted were bonded to a surface of the pattern layer 2 of the primary film layer 7 by a dry lamination method via the adhesive layer 6 made of an adhesive for dry lamination (TAKELAC A540; manufactured by Mitsui Chemicals, Inc., applied amount 2 g/m$^2$).

<Preparation of Embossed Pattern>

A surface of the transparent resin layer 1 of the sheet thus laminated was subjected to pressing by using an embossing roll die to form an embossed pattern 1$a$.

<Preparation of Top Coat Agent X Used for Surface Protective Layer 4$b$>

A top coat agent X contained a thermosetting resin X as a base resin. The thermosetting resin X was an acrylic polymer having a glass transition temperature of approximately 100° C., a mass average molecular weight Mw of approximately 60,000 and a hydroxyl group value of 16. The top coat agent X was prepared by blending 5 parts of Tinuvin 479 (manufactured by BASF Corporation) as an ultraviolet absorber, 3 parts of Tinuvin 123 (manufactured by BASF Corporation) as a photostabilizer, 50 parts of ethyl acetate as dilution solvent, 15 parts of inorganic filler L-121 (manufactured by AGC Si-Tech Co., Ltd.) as a gloss adjusting agent, and 5 parts of DURANATE TAP-100 (manufactured by Asahi Kasei Corp.) as a curing agent with 100 parts of the base resin.

<Preparation of Surface Protective Layer 4b>

After the embossed pattern 1a was formed on the transparent resin layer 1, the top coat agent X was applied at 10 g/m² to the transparent resin layer 1 to form a surface protective layer 4b.

<Preparation of Top Coat Agent Y Used for Surface Protective Layer 4a>

A top coat agent Y contained an ionizing radiation-curable resin Y as a base resin. The ionizing radiation-curable resin Y was polyfunctional urethane acrylate oligomers having 3 to 15 functional groups.

The top coat agent Y was prepared by blending 5 parts of Tinuvin 479 (manufactured by BASF Corporation) as an ultraviolet absorber, 3 parts of Tinuvin 123 (manufactured by BASF Corporation) as a photostabilizer, 8 parts of Sylophobic 702 (manufactured by Fuji Silysia Chemical Ltd.) as a gloss adjusting agent, and 50 parts of ethyl acetate as a dilution solvent with 100 parts of the base resin.

<Preparation of Surface Protective Layer 4a>

The top coat agent Y was applied at 5 g/m² to a surface of the surface protective layer 4b to form a surface protective layer 4a.

The decorative sheets obtained in Examples 2-1 to 2-2 and Comparative Examples 2-1 to 2-2 were each bonded to a wood substrate via a urethane-based adhesive. Then, the surface hardness was determined by a Hoffman scratch test and a coin scratch test. In addition, the weather resistance was determined by a metal weather test. Table 4 shows the evaluation results.

The test methods of the Hoffman scratch test and the coin scratch test have been described in the first example, and will not be described again.

TABLE 4

| | Erosion rate Polygonal | Hoffman scratch | Coin scratch | Weather resistance |
|---|---|---|---|---|
| Comparative Example 2-1 | 0.047 | Poor | Poor | Excellent |
| Example 2-1 | 0.52 | Good | Good | Good |
| Example 2-2 | 1.4 | Excellent | Excellent | Good |
| Comparative Example 2-2 | 2.1 | Excellent | Excellent | Poor |

The test method for evaluating weather resistance will be briefly described below.

<Weather Resistance Test>

A carbon arc weathering test according to JISB 7753 was performed by using a weathering tester (Sunshine Weather Meter (SWOM): manufactured by Suga Test Instruments Co., Ltd.). The time until cracking or whitening occurred on the surface of the decorative sheets was measured.

Excellent: Weathering tester 2500 hours or more

Good: Weathering tester 2000 hours or more and less than 2500 hours

Fair: Weathering tester 1500 hours or more and less than 2000 hours

Poor: Weathering tester less than 1500 hours

In the weather resistance test, "Excellent," "Good," and "Fair" were judged as passes.

As seen from Table 4, the results of the decorative sheets according to Examples 2-1 to 2-2 of the present invention were well-balanced in scratch resistance and weather resistance.

Third Example

Specific examples of the decorative sheet of the present invention will be described below.

<Common Materials>

In Examples 3-1 to 3-10, and Comparative Examples 3-1 to 3-2, the layers other than the surface protective layer 4a were made of the same materials.

<Preparation of Transparent Resin Layer>

A decorative sheet having a configuration of FIG. 2 was prepared. Specifically, a resin, in which 0.5 parts by mass of hindered phenol-based antioxidant (Irganox 1010; manufactured by BASF Corporation), 20 parts by weight of benzotriazole-based ultraviolet absorbent (Tinuvin 328: manufactured by BASF Corp.), and 20 parts by weight of hindered amine-based photostabilizer (CHIMASSORB 944; manufactured by BASF Corp.), and 10 parts by weight of nano nucleating agent were added to 100 parts by mass of highly crystalline homopolypropylene resin having an isotactic pentad fraction of 97.8%, an MFR (melt flow rate) of 15 g/10 min (230° C.), and a molecular weight distribution MWD (Mw/Mn) of 2.3, was extruded by using a melt extruder to thereby obtain a 100-μm thick transparent resin sheet made of highly crystalline polypropylene, which was used as a transparent resin layer 1. Then, both surfaces of the transparent resin sheet thus formed were subjected to a corona treatment to provide the surface with a wetting tension of 40 dyn/cm or higher. Further, the cooling conditions in extrusion film formation was controlled so that a crystalline polypropylene resin of the transparent resin sheet has a haze value of 8.5%.

<Nanoization of Nucleating Agent Using Supercritical Reverse Phase Evaporation Method>

A nanoization method for a nucleating agent using a supercritical reverse phase evaporation method in the present example will be described.

First, 100 parts by mass of methanol, 82 parts by mass of phosphate ester metal salt nucleating agent (ADK STAB NA-11, manufactured by ADEKA), and 5 parts by mass of phosphatidylcholine were put into a high-pressure stainless steel container kept at 60° C., and after sealing the container, carbon dioxide was injected into the container so that pressure became 20 MPa and a supercritical state was reached. Then, 100 parts by mass of deionized water was introduced under vigorous stirring and mixing. After stirring for 15 minutes while maintaining the temperature and the pressure in the container, carbon dioxide was discharged to return to atmospheric pressure, thereby obtaining nucleating agent vesicles including an outer membrane of phospholipid encapsulating the nucleating agent.

<Preparation of Pattern Layer and Concealing Layer>

The obtained transparent resin sheet was used as the transparent resin layer 1. A pattern layer 2 was formed on a first surface of the transparent resin layer 1 by printing a pattern using a two-part curing type urethane ink (V351, manufactured by Toyo Ink Co., Ltd.). Then, a concealing layer 3 was formed on the pattern layer 2 by applying a 6 g/m² of two-part curing type urethane ink (V351, manufactured by Toyo Ink Co., Ltd.) having concealing properties.

<Preparation of Primer Layer>

In addition, a primer layer 5 was formed on the concealing layer 3 by applying a 1 g/m² of two-part curing type urethane ink (PET-E, reducer: manufactured by Dainichiseika Color & Chemicals Mfg. Co., Ltd.) as a primer coat.

<Preparation of Embossed Pattern>

Then, an embossed pattern 1a was formed on a second surface of the transparent resin layer 1 by pressing using an embossing roll die.

<Preparation of Surface Protective Layer 4b>

The embossed pattern 1a was coated with a 10 g/m² of two-part curing type urethane top coat (TD365UR varnish, Z202 curing agent: both manufactured by Toyo Ink Co., Ltd.).

<Preparation of Surface Treatment Filler>

The surface treatment inorganic microparticles NVC-X1 used in each of examples and comparative examples were obtained by applying a surface treatment to inorganic microparticles (L-121: manufactured by AGC Si-Tech Co., Ltd.) by using a surface treatment agent having an OH group at a terminal.

The surface treatment was performed by a dry method. Specifically, 100 parts by mass of L-121 (inorganic microparticles) were introduced in a Henschel mixer provided with a spray nozzle port, and, while being stirred, 10 parts by mass of the surface treatment agent was sprayed to react the inorganic microparticles with the surface treatment agent.

<Preparation of Surface Protective Layer 4a and 4b>

The surface protective layer 4a was prepared by using the top coat agent E to the top coat agent H.

<Top Coat Agent Used for Surface Protective Layer 4a>

The top coat agent E, the top coat agent F, the top coat agent G, and the top coat agent H were used as the top coat agent.

The top coat agent E and the top coat agent F contained ionizing radiation-curable resins (ionizing radiation-curable resins) E and F, respectively, as base resins, and the top coat agent G and the top coat agent H contained thermosetting resins (thermosetting resins) G and H, respectively, as base resins.

The ionizing radiation-curable resins E and F were polyfunctional urethane acrylate oligomers having 3 to 15 functional groups and 2 to 9 functional groups, respectively.

The thermosetting resin G was an acrylic polyol having a glass transition temperature of approximately 100° C., a mass average molecular weight Mw of approximately 50,000 and a hydroxyl group value of 15, and the thermosetting resin H was an acrylic polyol having a glass transition temperature of approximately 45° C., a mass average molecular weight Mw of approximately 150,000 and a hydroxyl group value of 15.

The top coat agent E, the top coat agent F, the top coat agent G, and the top coat agent H were prepared by blending 5 parts of Tinuvin 479 (manufactured by BASF Corporation) as an ultraviolet absorber, 3 parts of Tinuvin 123 (manufactured by BASF Corporation) as a photostabilizer, and 50 part of ethyl acetate as a dilution solvent with 100 parts of each of the ionizing radiation-curable resin E, the ionizing radiation-curable resin F, the thermosetting resin G, and the thermosetting resin H, and further adding 5 parts of DURANATE TAP-100 (manufactured by Asahi Kasei Corp.) as a curing agent for the top coat agent G and the top coat agent H.

<Top Coat Agent I Used for Surface Protective Layer 4b>

A top coat agent I was used for the surface protective layer 4b.

The top coat agent I contained a thermosetting resin (thermosetting resin) I as a base resin.

The thermosetting resin I was an acrylic polyol having a glass transition temperature of approximately 100° C., a mass average molecular weight Mw of approximately 40,000, and a hydroxyl group value of 12.

The top coat agent I was prepared by blending 5 parts of Tinuvin 479 (manufactured by BASF Corporation) as an ultraviolet absorber, 3 parts of Tinuvin 123 (manufactured by BASF Corporation) as a photostabilizer, 50 parts of ethyl acetate as dilution solvent, 15 parts of inorganic filler L-121 (manufactured by AGC Si-Tech Co., Ltd.) as a gloss adjusting agent, and 5 parts of DURANATE TAP-100 (manufactured by Asahi Kasei Corp.) as a curing agent with 100 parts of the base resin.

Example 3-1

A coating agent was prepared by mixing the ionizing radiation-curable top coat agents E and F at 50:50, and adding 8 parts of inorganic microparticles NVC-X1, which were surface-treated, having an average particle size of 5 μm to the mixture. The coating agent was applied at 5 g/m² to the surface protective layer 4b. Thus, the surface protective layer 4a of Example 3-1 was formed.

Example 3-2

A coating agent was prepared by mixing the ionizing radiation-curable top coat agents E and F, and the thermosetting top coat agent G at 40:40:20 and adding 8 parts of inorganic microparticles NVC-X1, which were surface-treated, having an average particle size of 5 μm, to the mixture. The coating agent was applied at 5 g/m² to the surface protective layer 4b. Thus, the surface protective layer 4a of Example 3-2 was formed.

Comparative Example 3-1

A coating agent was prepared by mixing the ionizing radiation-curable top coat agents E and F, and the thermosetting top coat agent H at 40:40:20 and adding 8 parts of inorganic microparticles NVC-X1, which were surface-treated, having an average particle size of 5 μm to the mixture. The coating agent was applied at 5 g/m² to the surface protective layer 4b. Thus, the surface protective layer 4a of Comparative Example 3-1 was formed.

Comparative Example 3-2

A coating agent was prepared by mixing the ionizing radiation-curable top coat agents E and F, and the thermosetting top coat agent G at 30:30:40 and adding 8 parts of inorganic microparticles NVC-X1, which were surface-treated, having an average particle size of 5 μm, to the mixture. The coating agent was applied at 5 g/m² to the surface protective layer 4b. Thus, the surface protective layer 4a of Comparative Example 3-2 was formed.

Example 3-3

A coating agent was prepared by mixing the ionizing radiation-curable top coat agents E and F at 25:75, and adding no inorganic microparticles. The coating agent was applied at 5 g/m² to the surface protective layer 4b. Thus, the surface protective layer 4a of Example 3-3 was formed.

Example 3-4

A coating agent was prepared by mixing the ionizing radiation-curable top coat agents E and F at 25:75, and adding 10 parts of inorganic microparticles NVC-X1, which were surface-treated, having an average particle size of 5 μm to the mixture. The coating agent was applied at 5 g/m² to the surface protective layer 4b. Thus, the surface protective layer 4a of Example 3-4 was formed.

Example 3-5

A coating agent was prepared by mixing the ionizing radiation-curable top coat agents E and F at 25:75, and adding 10 parts of inorganic microparticles NVC-X1, which were surface-treated, having an average particle size of 8 μm to the mixture. The coating agent was applied at 5 g/m² to the surface protective layer 4b. Thus, the surface protective layer 4a of Example 3-5 was formed.

Example 3-6

A coating agent was prepared by mixing the ionizing radiation-curable top coat agents E and F at 25:75, and adding 10 parts of inorganic microparticles NVC-X1, which were surface-treated, having an average particle size of 17 μm to the mixture. The coating agent was applied at 5 g/m² to the surface protective layer 4b. Thus, the surface protective layer 4a of Example 3-6 was formed.

Example 3-7

A coating agent was prepared by mixing the ionizing radiation-curable top coat agents E and F at 25:75, and adding 10 parts of inorganic microparticles L-121, which were not surface-treated, having an average particle size of 5 μm to the mixture. The coating agent was applied at 5 g/m² to the surface protective layer 4b. Thus, the surface protective layer 4a of Example 3-7 was formed.

Example 3-8

A coating agent was prepared by mixing the ionizing radiation-curable top coat agents E and F at 25:75, and adding 5 parts of inorganic microparticles NVC-X1, which were surface-treated, having an average particle size of 5 μm to the mixture. The coating agent was applied at 5 g/m² to the surface protective layer 4b. Thus, the surface protective layer 4a of Example 3-8 was formed.

Example 3-9

A coating agent was prepared by mixing the ionizing radiation-curable top coat agents E and F at 25:75, and adding 20 parts of inorganic microparticles NVC-X1, which were surface-treated, having an average particle size of 5 μm to the mixture. The coating agent was applied at 5 g/m² to the surface protective layer 4b. Thus, the surface protective layer 4a of Example 3-9 was formed.

Example 3-10

A coating agent was prepared by mixing the ionizing radiation-curable top coat agents E and F at 25:75, and adding 35 parts of inorganic microparticles NVC-X1, which were surface-treated, having an average particle size of 5 μm to the mixture. The coating agent was applied at 5 g/m² to the surface protective layer 4b. Thus, the surface protective layer 4a of Example 3-10 was formed.

The method for measuring the erosion rate E of the decorative sheets obtained in each of Examples 3-1 to 3-10 and Comparative Examples 3-1 to 3-2 will be described below.

Polygonal alumina powder having an average particle size $D_{50}=1.2$ μm was dispersed in water to prepare a slurry containing 3 mass % of polygonal alumina powder to a total mass of slurry. A decorative sheet was fixed to a table so that a projection distance between the decorative sheet and a nozzle for spraying the slurry was set to 4 mm. The nozzle diameter was 1 mm×1 mm. Slurry containing polygonal alumina powder was sprayed from the nozzle so that the decorative sheet fixed to the table was eroded sequentially from a surface protective layer. The spray strength was determined based on a standard projection force X, which was obtained by performing erosion of an existing Si wafer in advance under the same experimental conditions and obtaining an amount of surface displacement due to the erosion relative to the sprayed amount of slurry (that is, a depth of cut due to spray of 1 g of slurry). In the present example using polygonal alumina powder, a projection force by which an existing Si wafer was eroded by 6.360 μm/g was defined as a standard projection force X.

For polygonal alumina powder according to the present example, a projection force of X=1/100 (projection force by which an existing Si wafer was eroded by 0.064 μm/g) was used.

After the eroded portion was washed with water, the eroded depth, that is, an erosion depth Z, was measured.

The erosion depth Z was measured by using a stylus surface profilometer (manufactured by Kosaka Laboratory Ltd./model No. PU-EU1/stylus tip R=2 μm/load 100 μN/measurement magnification 10,000/measurement length 4 mm/measurement speed 0.2 mm/sec). More specifically, inclination correction was first performed by using reference areas A and B which were not worn on either end of the measurement length. Then, the difference in level from a regression line as a reference to a wear mark center C (average value of 50 μm width) was measured. Then, the erosion depth Z was obtained from the difference between the level difference data at 0 g projection and the level difference data at each projection amount. From the obtained data of the projection amount–the erosion depth Z, an erosion progress graph and an erosion rate distribution graph were prepared. Thus, the erosion depth Z was determined.

In the present example, the above erosion treatment and the profile measurement using the above profilometer were repeatedly performed for a predetermined number of times (N times), and the profile measurement data for N times was obtained.

Further, in the present example, an erosion rate E [μm/g] was calculated by using the projection particle amount X' [g] and the erosion depth Z [μm] calculated by the above projection force.

The decorative sheets obtained in Examples 3-1 to 3-10 and Comparative Examples 3-1 to 3-2 were each bonded to a wood substrate via a urethane-based adhesive. Then, the surface hardness was determined by a Hoffman scratch test, a coin scratch test, and a steel wool rubbing test. For the decorative sheets obtained in each of Examples 3-1 to 3-10 and Comparative Examples 3-1 to 3-2, the degree of whitening on a surface was determined. Tables 5 to 8 show the evaluation results.

The test methods of the Hoffman scratch test, the coin scratch test, and the steel wool rubbing test have been described in the first example, and will not be described again.

The test method for evaluating whitening will be briefly described below.

<Measurement of Whitening>

The measurement of whitening was performed by measuring a gloss value on a surface of the decorative sheet under the condition of incident angle of 60° by using a handy gloss checker "Gloss checker" IG-320 manufactured by Horiba, Ltd.

Good: No whitening occurred (Gloss value is less than 1.0)

Poor: Whitening occurred (Gloss value is 1.0 or more)

In the measurement of whitening, "Good" was judged as a pass.

TABLE 5

| | Target surface protective layer | Top coat agent (resin composition) | | | | Filler | | | Erosion rate Polygonal | Static friction coefficient | Hoffman scratch | Coin scratch | Steel wool | Whitening |
|---|---|---|---|---|---|---|---|---|---|---|---|---|---|---|
| | | E | F | G | H | Diameter | Treatment | Parts | | | | | | |
| Example 3-1 | Surface protective layer 4a | 50 | 50 | — | — | 5 | Treated | NVC-X1 8 | 0.25 | 0.29 | Excellent | Excellent | Excellent | Good |
| Example 3-2 | Surface protective layer 4a | 40 | 40 | 20 | — | 5 | Treated | NVC-X1 8 | 0.3 | 0.35 | Excellent | Excellent | Excellent | Good |
| Comparative Example 3-1 | Surface protective layer 4a | 40 | 40 | — | 20 | 5 | Treated | NVC-X1 8 | 0.7 | 0.41 | Poor | Good | Poor | Good |
| Comparative Example 3-2 | Surface protective layer 4a | 30 | 30 | 40 | — | 5 | Treated | NVC-X1 8 | 0.6 | 0.39 | Poor | Good | Poor | Good |

TABLE 6

| | Target surface protective layer | Top coat agent (resin composition) | | | | Filler | | | Erosion rate Polygonal | Static friction coefficient | Hoffman scratch | Coin scratch | Steel wool | Whitening |
|---|---|---|---|---|---|---|---|---|---|---|---|---|---|---|
| | | E | F | G | H | Diameter | Treatment | Parts | | | | | | |
| Example 3-3 | Surface protective layer 4a | 25 | 75 | — | — | — | — | 0 | 0.25 | 0.35 | Fair | Good | Fair | Good |
| Example 3-4 | Surface protective layer 4a | 25 | 75 | — | — | 5 | Treated | NVC-X1 10 | 0.22 | 0.37 | Excellent | Excellent | Excellent | Good |
| Example 3-5 | Surface protective layer 4a | 25 | 75 | — | — | 8 | Treated | NVC-X1 10 | 0.28 | 0.44 | Excellent | Excellent | Excellent | Good |
| Surface 3-6 | Surface protective layer 4a | 25 | 75 | — | — | 17 | Treated | NVC-X1 10 | 0.39 | 0.63 | Fair | Good | Fair | Good |

TABLE 7

| | Target surface protective layer | Top coat agent (resin composition) | | | | Filler | | | Erosion rate Polygonal | Static friction coefficient | Hoffman scratch | Coin scratch | Steel wool | Whitening |
|---|---|---|---|---|---|---|---|---|---|---|---|---|---|---|
| | | E | F | G | H | Diameter | Treatment | Parts | | | | | | |
| Example 3-4 | Surface protective layer 4a | 25 | 75 | — | — | 5 | Treated | NVC-X1 10 | 0.22 | 0.37 | Excellent | Excellent | Excellent | Good |
| Example 3-7 | Surface protective layer 4a | 25 | 75 | — | — | 5 | Untreated | NVC-X1 10 | 0.25 | 0.59 | Fair | Good | Fair | Good |

TABLE 8

| Target surface protective layer | Top coat agent (resin composition) | | | | | Filler | | | Erosion rate | Static friction | Hoffman | Coin | Steel | |
| | E | F | G | H | Diameter | Treatment | | Parts | Polygonal | coefficient | scratch | scratch | wool | Whitening |
|---|---|---|---|---|---|---|---|---|---|---|---|---|---|---|
| Example 3-3 | Surface protective layer 4a | 25 | 75 | — | — | — | Treated | | 0 | 0.25 | 0.35 | Fair | Fair | Fair | Good |
| Example 3-8 | Surface protective layer 4a | 25 | 75 | — | — | 5 | Treated | NVC-X1 | 5 | 0.23 | 0.33 | Excellent | Excellent | Excellent | Good |
| Example 3-4 | Surface protective layer 4a | 25 | 75 | — | — | 5 | Treated | NVC-X1 | 10 | 0.22 | 0.37 | Excellent | Excellent | Excellent | Good |
| Example 3-9 | Surface protective layer 4a | 25 | 75 | — | — | 5 | Treated | NVC-X1 | 20 | 0.33 | 0.45 | Good | Good | Good | Good |
| Example 3-10 | Surface protective layer 4a | 25 | 75 | — | — | 5 | Treated | NVC-X1 | 35 | 0.37 | 0.75 | Fair | Fair | Fair | Poor |

As seen from Tables 5 and 8, the results of the decorative sheets according to Examples 3-1 to 3-10 of the present invention were well-balanced in scratch resistance.

When the resin composition of the surface protective layer 4a included 65% or more of the ionizing radiation-curable resin or a thermosetting resin having a rigid skeleton, the erosion rate E was small and the results of the Hoffman scratch test and the steel wool rubbing test were particularly good.

Further, when the inorganic filler added to the surface protective layer 4a was surface-treated and had an appropriate average particle size, and the additive amount was appropriate, the static friction coefficient was small and thus the resistance was small. Accordingly, the results of the Hoffman scratch test and the steel wool rubbing test were particularly good.

In addition, if the surface protective layer 4a contained the inorganic microparticles, the results of the Hoffman scratch were good.

According to the decorative sheets of Examples 3-1 to 3-9 of the present invention, good scratch resistance and reduced whitening on the surface can be provided.

The decorative sheet of the present invention is not limited to the aforementioned embodiments and examples, and various modifications may be made within a range not departing from the spirit of the present invention.

REFERENCE SIGNS LIST

1 Transparent resin layer; 1a Embossed pattern; 2 Pattern layer; 3 Concealing layer; 4 Surface protective layer; 4a Surface protective layer (First surface protective layer); 4b Surface protective layer (Second surface protective layer); 5 Primer layer; 6 Adhesive layer; 7 Primary film layer; 8 Adhesive resin layer.

What is claimed is:

1. A decorative sheet, comprising:
a primary film;
a transparent resin layer; and
a surface protective layer, laminated in this order, wherein the surface protective layer is formed of a plurality of layers,
a layer of the surface protective layer located on an outermost surface is a first surface protective layer, and a layer underlying the first surface protective layer is a second surface protective layer,
the first surface protective layer includes one or more ionizing radiation-curable resins having an erosion rate E in a range of 0.10 µm/g or more and 0.45 µm/g or less, and one or more thermosetting resins having an erosion rate E in a range of 0.30 µm/g or more and 0.6 µm/g or less, the first surface protective layer has an erosion rate E in a range of 0.2 µm/g or more and 0.45 µm/g or less, the erosion rate E of the one or more ionizing radiation-curable resins, the one or more thermosetting resins or the first protective layer being measured by using polygonal alumina particles having an average particle size (D50) of 1.2 µm, and
a mass ratio between the ionizing radiation-curable resin and the thermosetting resin (ionizing radiation-curable resin/thermosetting resin) is 95/5 to 40/60.

2. The decorative sheet of claim 1, wherein the ionizing radiation-curable resin of the first surface protective layer contains one or more components having a functional group of 6 or more and a mass average molecular weight of 1,000 or more.

3. The decorative sheet of claim 1, wherein
the first surface protective layer has a thickness in a range of 2 µm or more and 7 µm or less,
the second surface protective layer has a thickness in a range of 2 µm or more and 14 µm or less, and
the entire surface protective layer has a thickness in a range of 4 µm or more and 21 µm or less.

4. The decorative sheet of claim 1, wherein the transparent resin layer has an erosion rate E in a range of 0.05 µm/g or more and 2 µm/g or less, the erosion rate E being measured by using polygonal alumina particles having an average particle size (D50) of 1.2 µm.

5. The decorative sheet of claim 1, wherein the transparent resin layer has the erosion rate E in a range of 0.1 µm/g or more and 2 µm/g or less.

6. The decorative sheet of claim 1, wherein the decorative sheet has a static friction coefficient µs (compliant with JIS K 7125) in a range of 0.25 or more and 0.5 or less.

7. The decorative sheet of claim 1, wherein the transparent resin layer has a thickness in a range of 40 µm or more and 170 µm or less.

8. The decorative sheet of claim 1, wherein
the surface protective layer contains an inorganic filler,
the inorganic filler has an average particle size in a range of 1 µm or more and 10 µm or less, and the inorganic filler is at least one of alumina, silica, aluminosilicate, glass, boehmite, iron oxide, magnesium oxide, and diamond.

9. The decorative sheet of claim 8, wherein
a content of the inorganic filler is in a range of 1 part by mass or more and 20 parts by mass or less when a resin constituting the first surface protective layer is 100 parts by mass.

10. The decorative sheet of claim 8, wherein the inorganic filler is subjected to surface treatment.

11. The decorative sheet of claim 10, wherein a surface treatment agent for treating a surface of the inorganic filler is at least one of a surfactant, a fatty acid metal salt, a silane coupling agent, a silicone, a wax, and a modified resin.

12. The decorative sheet of claim 8, wherein
the surface treatment agent for treating a surface of the inorganic filler has a reactive group that reacts with a base resin constituting the first surface protective layer.

13. The decorative sheet of claim 12, wherein the surface treatment agent for treating a surface of the inorganic filler is made of surface treatment agent-encapsulating vesicles, which are obtained by encapsulating the surface treatment agent in vesicles by a supercritical reverse phase evaporation method.

14. The decorative sheet of claim 1, wherein the decorative sheet does not contain a vinyl chloride resin.

15. A decorative sheet, comprising:
a primary film;
a transparent resin layer; and
a surface protective layer, laminated in this order, wherein
the surface protective layer is formed of a plurality of layers,
a layer of the surface protective layer located on an outermost surface is a first surface protective layer, and a layer underlying the first surface protective layer is a second surface protective layer, and
the first surface protective layer has an erosion rate E in a range of 0.1 µm/g or more and 0.4 µm/g or less, the erosion rate E being measured by using polygonal alumina particles having an average particle size ($D_{50}$) of 1.2 µm.

* * * * *